UNITED STATES PATENT OFFICE.

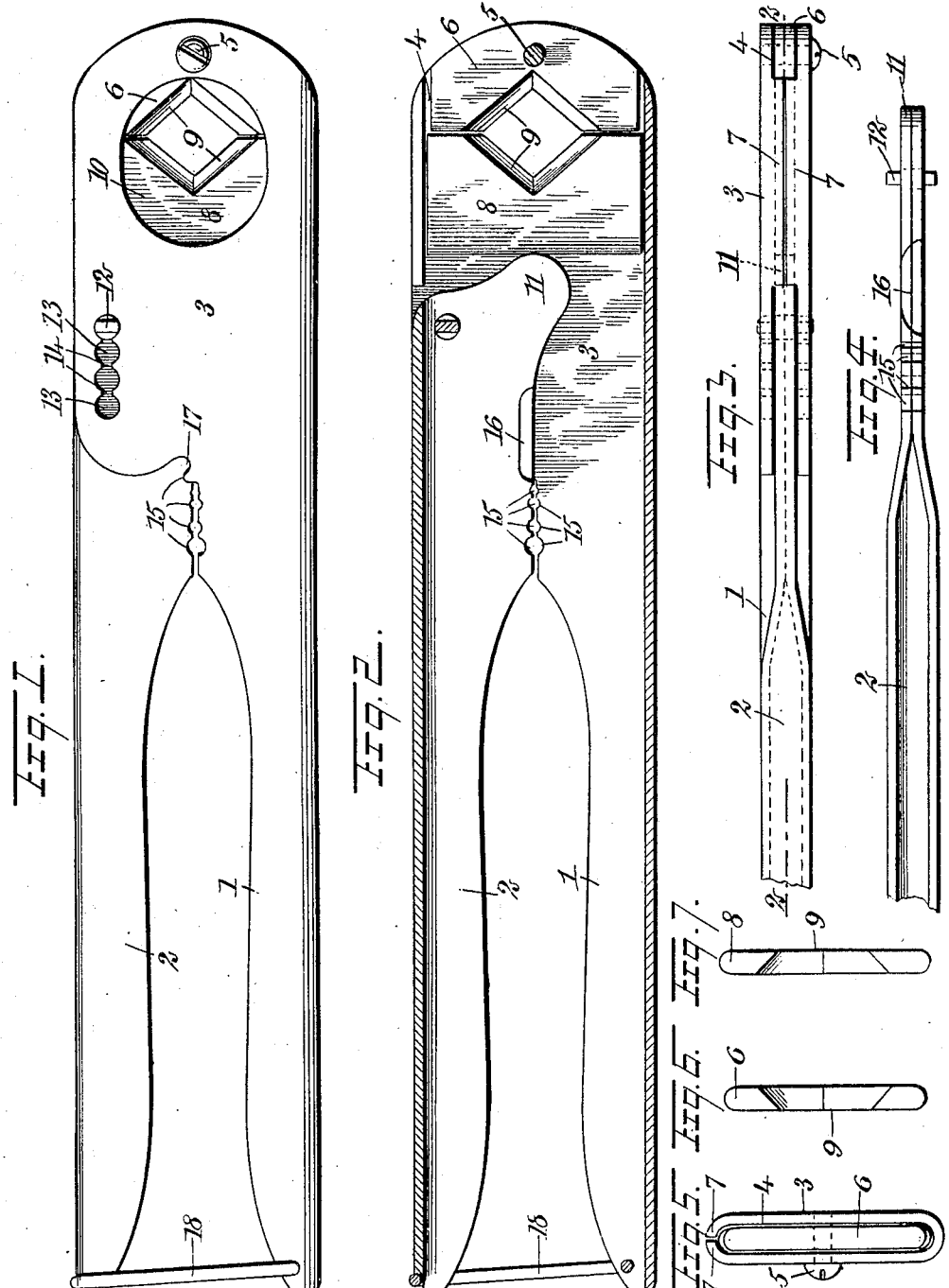

GEORGE H. GOODHOLM AND JACOB A. TRAIN, OF LINDSBORG, KANSAS.

TOOL.

No. 870,951.  Specification of Letters Patent.  Patented Nov. 12, 1907.

Application filed March 12, 1907. Serial No. 361,934.

*To all whom it may concern:*

Be it known that we, GEORGE H. GOODHOLM and JACOB A. TRAIN, citizens of the United States, and residents of Lindsborg, in the county of McPherson and State of Kansas, have invented a new and Improved Tool, of which the following is a full, clear, and exact description.

The invention has reference to improvements in tools for cutting pipes and rods, in addition to splicing wire, being more especially directed to the cutting of porcelain and other brittle tubes such as are used for insulating purposes.

The invention has for its objects, among others, the provision of means for the uniform cutting of tubes which may or may not be of exact cylindrical cross section, and for a novel pivotal adjustment for the operating levers.

Reference is to be had to the accompanying drawings forming a part of this specification, in which similar characters of reference indicate corresponding parts in all the figures.

Figure 1 is a side elevation of the tool with the levers locked; Fig. 2 is a longitudinal, vertical section of the same taken substantially on the line 2—2 of Fig. 3; Fig. 3 is a plan of the outer portion of the tool; Fig. 4 is an inverted plan of an operating lever; Fig. 5 is a front end view of the tool; Fig. 6 is an inside end view of one of the cutting blades, and Fig. 7 is a like view of the opposite cutting blade.

The tool as preferably constructed, comprises hand levers 1 and 2, made of sheet metal by bending the same upon itself leaving the opposed inner edges of the handle open, as is usual in plier construction. The lever 1 is extended at its forward end to provide a head 3, the walls of said head being slightly separated to provide a longitudinal slot 4, in the outer end of which is pivotally mounted as on a screw or pin 5, a cutting blade 6. The top of the slot 4 is closed at the outer end of the tool, as best shown in Figs. 3 and 5, by bending the opposed walls of the head inwardly, as indicated at 7.

Slidable within the slot 4 at the rear of the blade 6, is a cutting blade 8, both of said blades having V-shaped opposed cutting edges 9 forming a diamond-shaped opening therebetween which is located opposite to large elliptical openings 10 formed in the walls of the head 3, these latter openings providing access of a tube, rod or the like between the cutting blades. As shown in Figs. 2, 6 and 7, the cutting edges 9 of the blades are beveled in the same direction, bringing them adjacent to one wall of the slot 4 and in the same plane. This construction admits of the point at which the tube or rod is to be cut, to be accurately placed between the blades. The cutting edges of the blades by this arrangement will also remain in the same plane even although they be inaccurately ground. The cutting blade 6, as observed in Figs. 2 and 5, is made somewhat shorter than the blade 8 and slot 4, permitting it to have a limited movement on its pivot 5. This leaves the blade 6 free to rock when a tube or rod of inexact cylindrical cross section is being cut, whereby the cutting action takes place uniformly about its circumference.

For forcibly sliding the cutting blade 8 in the direction of the blade 6, the lever 2 is flattened at its forward end to fit the slot 4, and constructed with a cam 11, which is formed of a double thickness of metal, as clearly shown in Fig. 4. Fixed to this end of the lever 2 just above the cam 11, is a pivot-pin 12 projecting at opposite sides, where it is flattened on each side in a vertical direction when the lever is disposed horizontally. This pin is adapted to fit in any one of a series of communicating openings 13 formed in the walls of the head 3, the communicating portions of said openings being in the nature of slots 14, which are of a width equal to the short diameter of the pin 12. This construction adapts the pivotal connection between the levers to be shifted by swinging the lever 2 to a substantially vertical position, where it is stopped by the rear ends of the portions 7 and sliding the pivot 12 to the required opening.

The levers 1 and 2 at the rear of their pivotal connection are formed with a number of opposed cross grooves 15 of successive varying diameter, which are designed to splice wires as well known in the art. The lever 2 is also formed adjacent to the grooves 15, with a shearing edge 16 which coacts with a notch 17 formed in the lever 1 for cutting wire and other like material.

For locking the levers together during the cutting action of the blades 6 and 8, is provided at the rear end of the tool, a loop 18, said loop being swingingly connected to the lever 1 and adapted to engage with the extremity of the lever 2 when the levers are forced together, a notch being preferably cut in the upper face of the lever 2 for this purpose.

It is obvious that various immaterial changes may be made in the construction of the tool from that hereinbefore described, and we consider that we are entitled to such modifications of the same as fall within the scope of the annexed claims.

Having thus described our invention we claim as new and desire to secure by Letters Patent:

1. In a tool of the character described, cutting blades having opposed cutting edges, means providing for a limited pivotal movement of one of said blades, and a hand lever operable to force the other blade toward the pivoted blade.

2. In a tool of the character described, cutting blades arranged in the same plane having opposed V-shaped cutting edges, means providing for a limited pivotal movement of one of said blades, and means for slidably forcing the other blade toward the pivoted blade.

3. In a tool of the character described, a lever of sheet metal bent to form a slotted head closed at the opposite edges with said slot passing continuously through the head, a cutting blade secured within the slot of the head, a second blade opposed to the first slidable within the slot of the head, and a sheet metal lever having a cam pivoted in the slot of said head operable to force said slidable blade toward the other blade.

4. In a tool of the character described, a lever having a slotted head, a cutting blade pivoted in the slot of said head, a second cutting blade opposed to the first and slidable within the slot of said head, and a second lever pivoted to the head and having a cam projecting in the slot thereof operable to force said second cutting blade toward the pivoted blade.

5. In a tool of the character described, a lever having a slotted head, a cutting blade pivoted in the slot of said head, a second cutting blade opposed to the first and slidable within the slot of said head, a second lever pivoted to the head and having a cam projecting in the slot thereof operable to force said second cutting blade toward the pivoted blade, and means for locking the levers together.

6. In a tool of the character described, a lever having a slotted head constructed of sheet metal, a cutting blade pivoted within the slot of the head, a second blade opposed to the first slidable within the slot of said head, and a sheet metal lever having a cam pivoted to said head and operable to force said slidable blade toward the pivoted blade.

In testimony whereof we have signed our names to this specification in the presence of two subscribing witnesses.

GEORGE H. GOODHOLM.
JACOB A. TRAIN.

Witnesses:
AXEL E. ANDERSON,
M. T. BLOMGREN.